United States Patent
Rogers et al.

(10) Patent No.: US 9,221,715 B2
(45) Date of Patent: Dec. 29, 2015

(54) CHEMICAL STRENGTHENING OF ANTI-REFLECTIVE COATINGS (ARC)

(71) Applicant: Apple Inc., Cupertino, CA (US)

(72) Inventors: Matthew S. Rogers, San Jose, CA (US); Kristina A. Babiarz, San Jose, CA (US); Dale N. Memering, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 14/099,810

(22) Filed: Dec. 6, 2013

(65) Prior Publication Data
US 2015/0030859 A1    Jan. 29, 2015

Related U.S. Application Data

(60) Provisional application No. 61/858,529, filed on Jul. 25, 2013.

(51) Int. Cl.
| | | |
|---|---|---|
| C03C 21/00 | (2006.01) | |
| C03C 23/00 | (2006.01) | |
| G02B 1/10 | (2015.01) | |
| G02B 1/113 | (2015.01) | |

(52) U.S. Cl.
CPC ............ *C03C 21/002* (2013.01); *C03C 23/0055* (2013.01); *G02B 1/105* (2013.01); *G02B 1/113* (2013.01)

(58) Field of Classification Search
None
See application file for complete search history.

(56) References Cited

U.S. PATENT DOCUMENTS

| | | | | |
|---|---|---|---|---|
| 3,628,983 | A * | 12/1971 | Leger et al. | 428/81 |
| 4,721,657 | A | 1/1988 | Takahashi et al. | |
| 5,654,057 | A * | 8/1997 | Kitayama et al. | 428/64.1 |
| 6,133,618 | A | 10/2000 | Steiner | |
| 2006/0008656 | A1* | 1/2006 | Veerasamy | B32B 17/10036 428/434 |
| 2006/0216552 | A1* | 9/2006 | Ikenishi et al. | 428/846.9 |
| 2008/0295884 | A1 | 12/2008 | Sharma et al. | |
| 2010/0285277 | A1* | 11/2010 | Edwards | C03C 27/048 428/157 |
| 2010/0297430 | A1 | 11/2010 | Thies et al. | |
| 2011/0026126 | A1 | 2/2011 | Takada et al. | |
| 2012/0052271 | A1* | 3/2012 | Gomez et al. | 428/213 |
| 2013/0127202 | A1* | 5/2013 | Hart | 296/146.1 |
| 2013/0215513 | A1* | 8/2013 | Liang et al. | 359/601 |
| 2014/0141217 | A1* | 5/2014 | Gulati et al. | 428/212 |

FOREIGN PATENT DOCUMENTS

| | | |
|---|---|---|
| JP | 33321100 | 6/2002 |
| TW | 201129477 | 9/2011 |
| WO | WO01-98222 | 12/2001 |

OTHER PUBLICATIONS

PCT/US2014/046962. Int'l Search Report & Written Opinion (Nov. 7, 2014).
Taiwanese Patent Application No. 103124597—Office Action dated Sep. 15, 2015.

* cited by examiner

*Primary Examiner* — Lisa Herring
(74) *Attorney, Agent, or Firm* — Downey Brand LLP

(57) ABSTRACT

A strengthened film for a substrate such as a glass panel is provided. The strengthened film may be formed by implanting sodium in the film, and then performing an exchange through which the sodium is replaced by potassium. The film may be an anti-reflective coating. Related assemblies and methods are also provided.

17 Claims, 15 Drawing Sheets

CHEMICAL STRENGTHENING OF ANTI-REFLECTIVE COATINGS (ARC)

CROSS REFERENCE TO RELATED APPLICATION

This application claims priority to U.S. Provisional Patent Application No. 61/858,529, filed Jul. 25, 2013, which is hereby incorporated herein by reference in its entirety.

TECHNICAL FIELD

The present disclosure relates generally to chemical strengthening, and more particularly to chemical strengthening of films and substrates and related assemblies and methods. In another aspect, the present disclosure relates generally to computing and electronic devices, and more particularly to visual displays and presentations for such computing and electronic devices.

BACKGROUND

Personal computing and electronic devices, such as laptop computers, media players, cellular telephones, smartphones, personal digital assistants (PDAs) and the like are becoming ubiquitous. Such computing devices typically employ a display to output graphics, text, and other visual information. Often the display is covered by a panel that protects the display from damage and contamination. In many devices the panel is formed from glass. Glass panels may be preferable in that they may substantially avoid interfering with a user's view of the display due to desirable optical properties thereof.

The ability to provide such devices in decreasing sizes at affordable costs to consumers while still maintaining or increasing the power, operating speed and aesthetic appeal of such devices, has contributed greatly to this trend. Unfortunately, the trend of smaller, lighter and more powerful portable electronic devices presents continuing design challenges in the actual production of these devices, particularly where such devices have relatively large displays. Some design challenges associated with such portable electronic devices include the ability to provide clear and robust visual displays, minimize power consumption, and dissipate heat without sacrificing size, processing power or user convenience.

For example, many users like to be able to use their portable electronic devices at virtually any time, such as while the user is on the go or simply outdoors. As many consumers know, however, the use of a portable electronic device is not always ideal when the device is exposed to direct sunlight or when the ambient environment is unduly bright. For example, the relatively small size of a portable device having a powerful processing system can by itself lead to a significant amount of heat generation. As many consumers can attest, such a heated device condition can then be exacerbated by exposure to direct sunlight or being outdoors. The rapid heating or overheating of a portable electronic device in use in direct sunlight can be even further accelerated where the device has a large display screen that permits the ready passage of solar energy into the device.

An anti-reflective coating (or ARC) can be applied to the portable electronic device that can prevent overheating. Generally, the ARC is applied at a front surface of a cover glass, or glass panel. The ARC can be formed of many individual transmissive layers having differing optical characteristics that when taken together can provide an effective shield from the heating effects of direct sunlight. The ARC may additionally or alternatively improve the usability of the display by reducing reflections associated with viewing the display through the glass panel. The ARC and/or various other functional layers may be applied to the glass panel as a film. However, such films may be relatively weaker than the glass panel and may propagate cracks into the glass under certain circumstances.

Accordingly, strengthened films for display panels or other substrates may be desirable.

SUMMARY

Embodiments of the present disclosure relate to films and coatings for glass panels and other substrates that are strengthened. For example, an anti-reflective coating (ARC) for an electronic device may be strengthened to prevent cracking therein that can propagate to an underlying glass panel. The strengthened ARC can also facilitate heat dissipation for the device, reduce the absorption of heat from outside the device due to direct sunlight or other infrared sources, and/or reduce glare and reflections. This can be accomplished at least in part through the use of a specialized optical coating for the glass panel. The ARC may be adapted to reflect most infrared and ultraviolet wavelengths, transmit most electromagnetic wavelengths in the visible spectrum, and absorb, distribute and radiate a significant amount of blackbody radiation from inside the device.

In some embodiments at least one of the layers of the film or coating may be formed of silicon dioxide. In various detailed embodiments, the optical coating can include alternating layers of two different materials, such as, for example, silicon dioxide and tantalum pentoxide. The plurality of layers can have individual thicknesses ranging from about 10 to about 400 nanometers.

In one embodiment the film or coating may be strengthened by chemical strengthening. In this way, the ARC is strengthened to resist cracks and other surface defects that can propagate to the underlying cover glass having the potential to propagate further into the cover glass. Strengthening may occur by replacing atoms of the coating or film with another species of atoms having a larger size. For example, sodium (Na) atoms may be implanted in the film, and then potassium (K) atoms may exchange with the sodium to strengthen the film. A similar process may also be employed to strengthen the substrate itself. In another embodiment, potassium is directly inserted into a film or substrate to provide strengthening without performing an intermediate exchange with inserted sodium.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, assemblies, methods, and systems. These drawings in no way limit any changes in form and detail that may be made to the disclosure by one skilled in the art without departing from the spirit and scope of the disclosure.

DETAILED DESCRIPTION

Representative applications of assemblies, apparatuses, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting; such that other embodiments may be used, and changes may be made without departing from the spirit and scope of the disclosure. Although this disclosure primarily focuses on portable electronic devices for purposes of illustration and discussion, it will be readily appreciated that the present disclosure is not limited to such devices, and that the present disclosure can be used in conjunction with any computing device or item having a visual display or any substrate or film.

In this regard, as described in detail below, the following relates to strengthening films, also referred to herein as coatings, for substrates. It should be noted that the present description is generally provided in terms of films coupled to a substrate covering a display of an electronic device. However, the films disclosed herein may be employed with any substrate in accordance with embodiments of the disclosure. In this regard, the films may be employed with front, side, or back plates for electronic devices, substrates on laptop or television displays, automotive windows, building windows, and any other embodiment of substrate. Further, the methods described herein may be employed to strengthen the substrate itself rather than, or in addition to, a film thereon.

Figure 1:
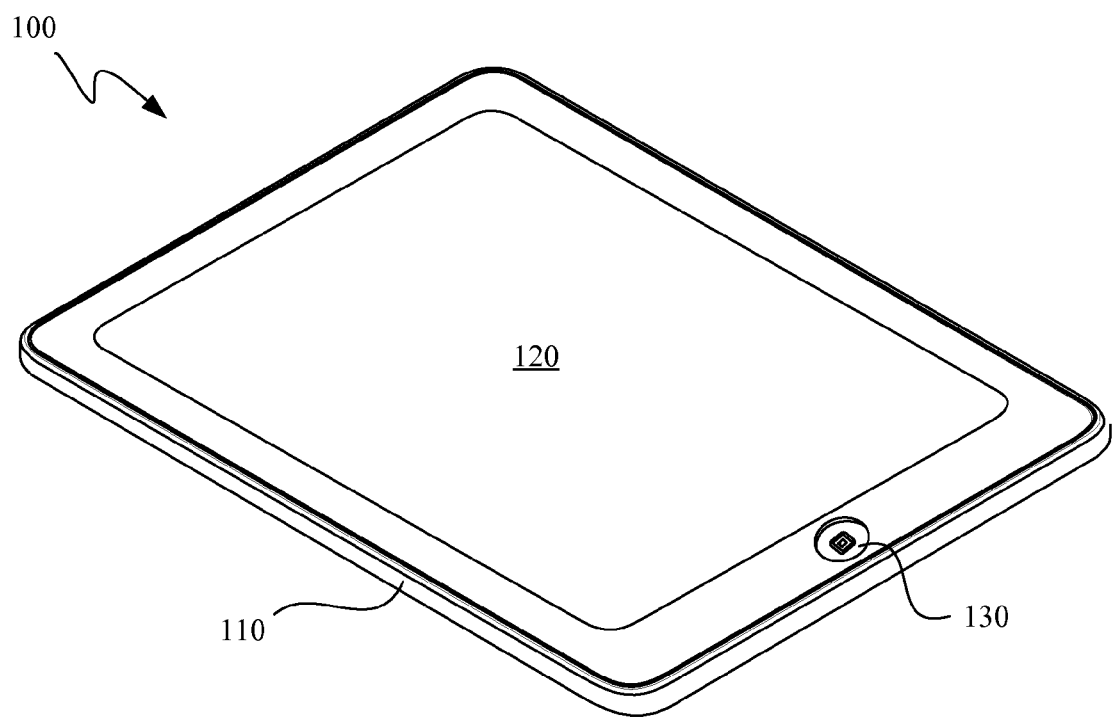
FIG. 1 illustrates in top perspective view of a portable electronic device according to an example embodiment of the present disclosure.

Turning first to FIG. 1, a portable electronic device 100 according to a first example embodiment of the present disclosure is illustrated in top perspective view. The portable electronic device 100 can be, for example, a tablet computing device, and can include an outer housing 110, a display assembly 120, and one or more buttons 130 or other user inputs. Such a tablet portable electronic device 100 can be, for example, an iPad® computing device manufactured and sold by Apple, Inc. of Cupertino, Calif., although many other types of devices may also be used. Although portable electronic device 100 can appear to be exactly or substantially like any other similar portable electronic device, it can be different due to the presence of a specialized coating being located proximate the visual display or display cover, as set forth in greater detail below.

Figure 2:
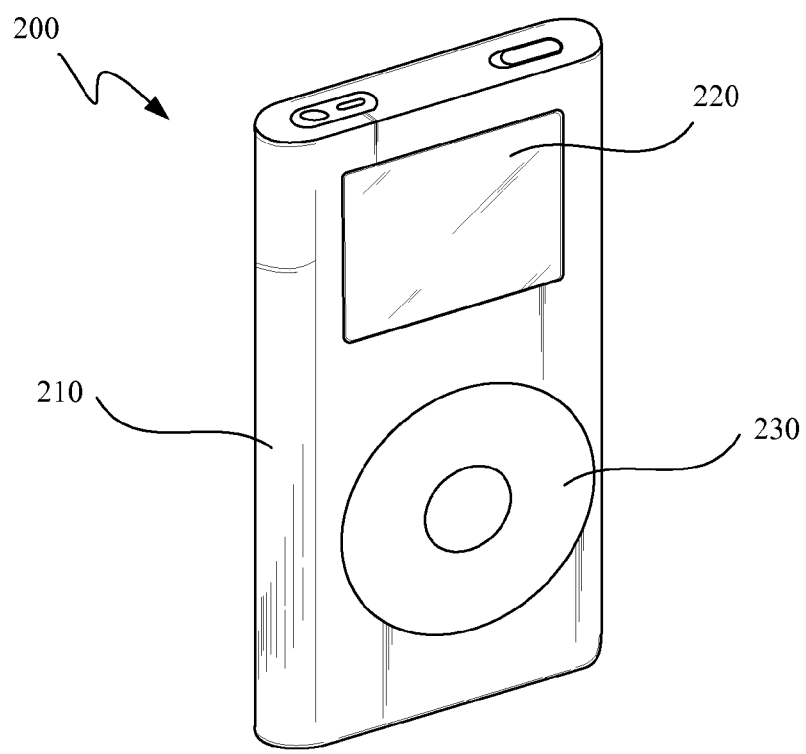
FIG. 2 illustrates a front facing perspective view of a portable electronic device according to a second example embodiment of the present disclosure.

FIG. 2 illustrates a front facing perspective view of a portable electronic device 200 according to another embodiment of the present disclosure. The portable electronic device 200 can be, for example, a portable media player having an outer housing 210, a display assembly 220 and a click-wheel 230 or other user input. Such a portable media player can be, for example, an iPod® computing device, also manufactured and sold by Apple, although many other types of media player devices may also be used. Again, device 200 can appear to be the same or similar to other devices, despite the presence of a specialized coating proximate the visual display.

In fact, virtually any device having a display screen can be suitable for use with the present disclosure, as will be readily appreciated by those skilled in the art. As such, the exemplary devices 100, 200 provided in FIGS. 1 and 2 serve only to illustrate examples of such devices, and in no way limit the amount or types of devices that can be used. Other types of devices that may also be used with the inventive optical display coating can include, for example, cellular telephones, pagers, laptop computers, desktop computers, televisions, and wristwatches among other possible devices.

Again, although virtually any type of device having a display screen can be used in conjunction with the present disclosure, the portable electronic devices described herein are being used simply for purposes of illustration with respect to the display screen and its specialized optical coating. Variations and extrapolations suitable for use with devices having different display screen types, sizes and dimensions can be applied as may be desired for any device having a display screen, as will be readily appreciated.

Figure 3:
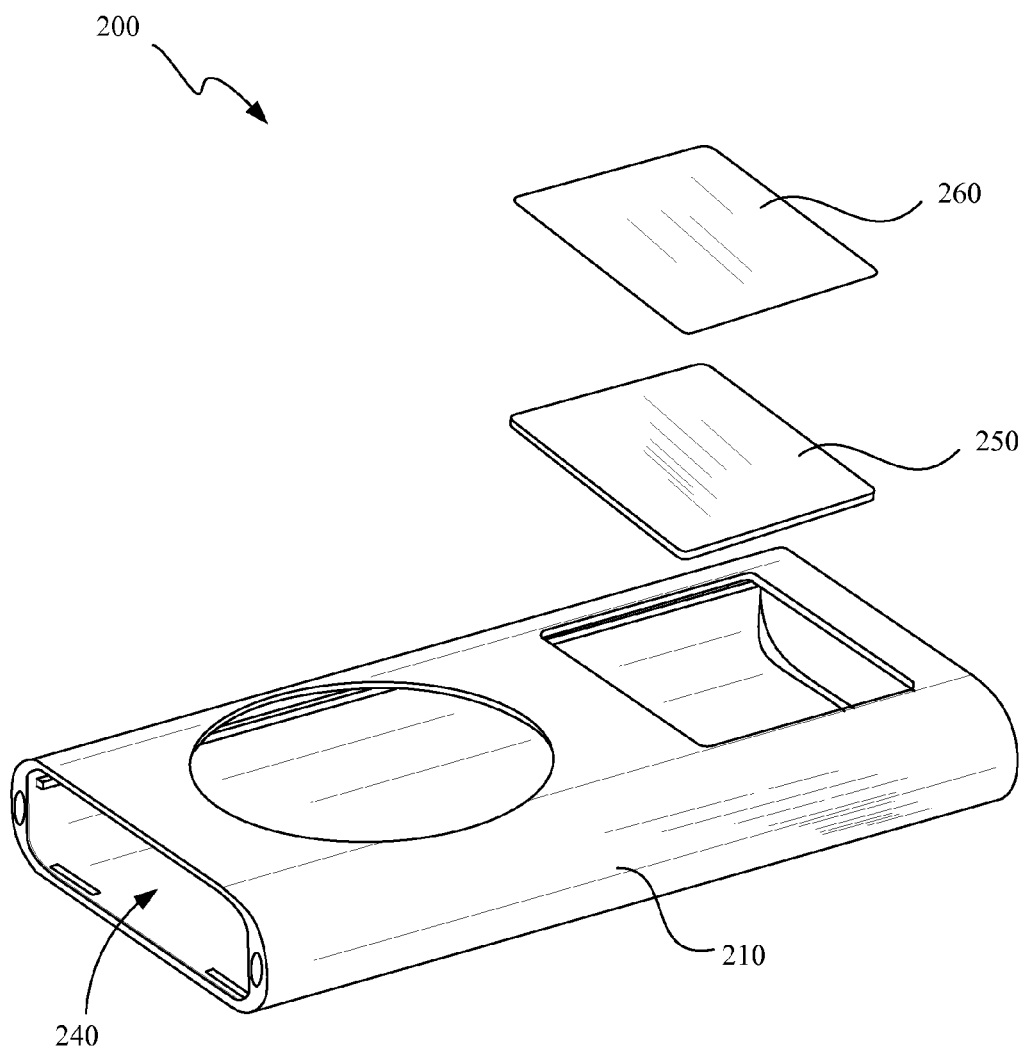
FIG. 3 illustrates a partially exploded side perspective view of the portable electronic device of FIG. 2 in which an optical coating is positioned outside of a display coating according to an example embodiment of the present disclosure.

Continuing with FIG. 3, the portable electronic device 200 of FIG. 2 is shown in side perspective and partially exploded view. The outer housing 210 of the portable electronic device 200 can define an interior cavity 240 adapted to contain various internal electronic components (not shown), such as a processor, memory, display device, speakers and the like. In addition to the display device, the display assembly 220 may include a transparent display cover 250 situated in an opening in the outer housing 210 that is specifically dimensioned to hold the display cover in place. The display cover 250 can be designed to protect a video or visual display (not shown) situated therebeneath, and is preferably see-through. Although the display cover 250 can be purely transparent, a partially transparent or translucent display cover may also be used, and it will be understood that all such variations can be considered "transparent" for purposes of the disclosed devices and displays.

Figure 4:
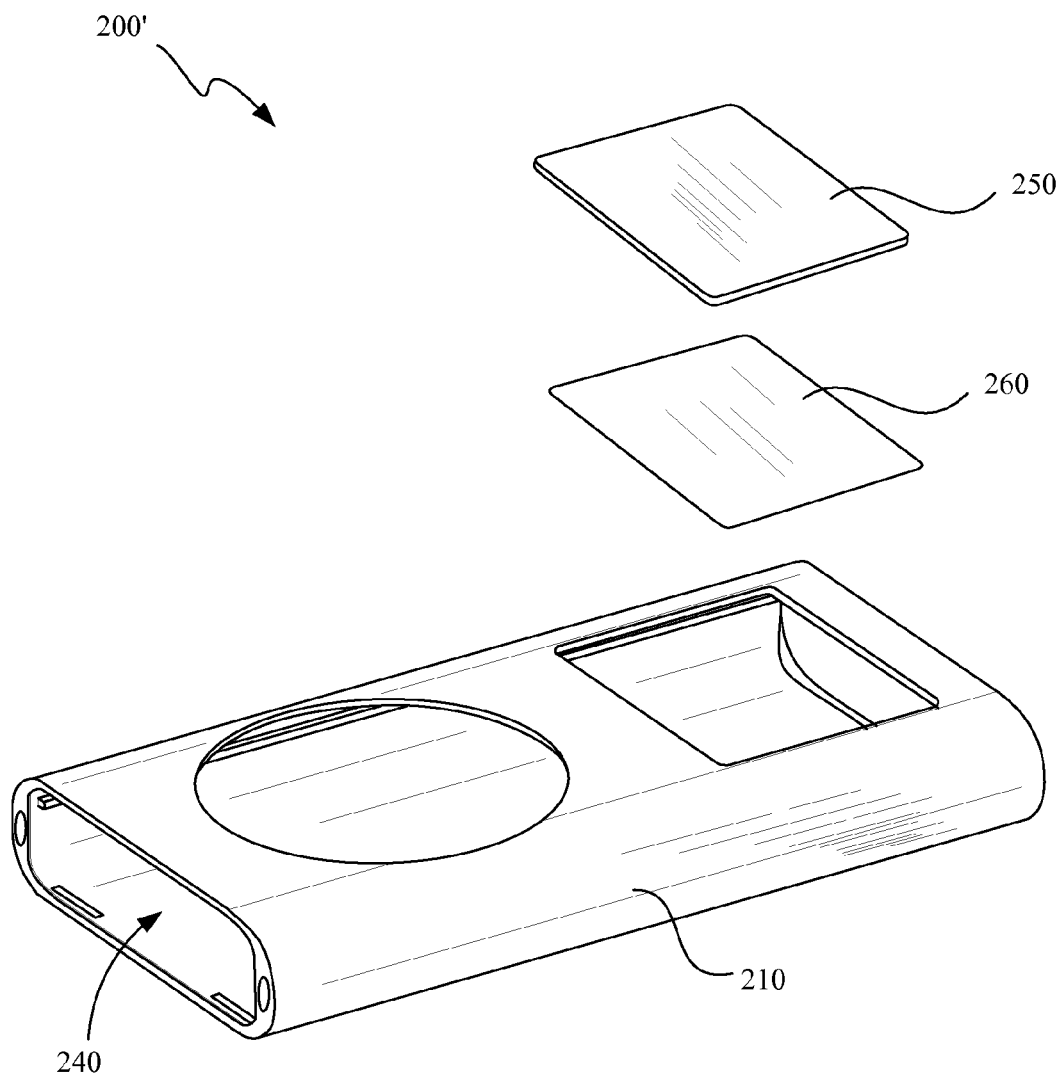
FIG. 4 illustrates a partially exploded side perspective view of the portable electronic device of FIG. 2 in which an optical coating is positioned inside of a display coating according to an example embodiment of the present disclosure.

A specialized optical coating 260, also referred to herein as a "film," can be situated atop the display cover 250, with details and properties of this optical coating or film being set forth in greater detail below. Although the optical coating 260 is shown in FIG. 3 as being atop display cover 250, the actual location can be beneath or otherwise proximate the display cover, depending upon the given application. In this regard, by way of example, FIG. 4 illustrates an embodiment of a portable electronic device 200', which is substantially similar to the electronic device 200 illustrated in FIG. 3, except the optical coating 260 is positioned beneath the display cover 250.

The optical coating can be specially formulated to block out unwanted solar energy, transmit visible light, absorb blackbody radiation, and/or reduce glare and reflections. This optical coating can be applied directly to a display cover glass or product skin, or can be applied indirectly via an accessory designed to interact with a visual display. Multiple different types of applications of such an optical coating can also be used in some instances.

In some embodiments the coating may comprise an anti-reflective coating. In general, the anti-reflective coating can be a thin overall coating that is made up of many alternating layers of thin materials having both high and low refractive indices, arranged in such a manner so as to: absorb blackbody radiation from inside the device to promote better device cooling; reflect most of all electromagnetic wavelengths that are not visible light to reduce device heating from outside sources; transmit most of all visible light wavelengths to enable robust visual displays; and/or reduce glare and reflections. In general, the coating operates such that the unwanted infrared and ultraviolet radiation from the sun is reflected back to the ambient environment as much as possible. This does not appear as glare to the user as these wavelengths are invisible. Visible light is transmitted through the optical coating as much as possible, so as not to interfere with the appearance and brightness of the intended visual image of the display. The coating also absorbs the black body infrared radiation range emitted by the device as much as possible.

Figure 5:
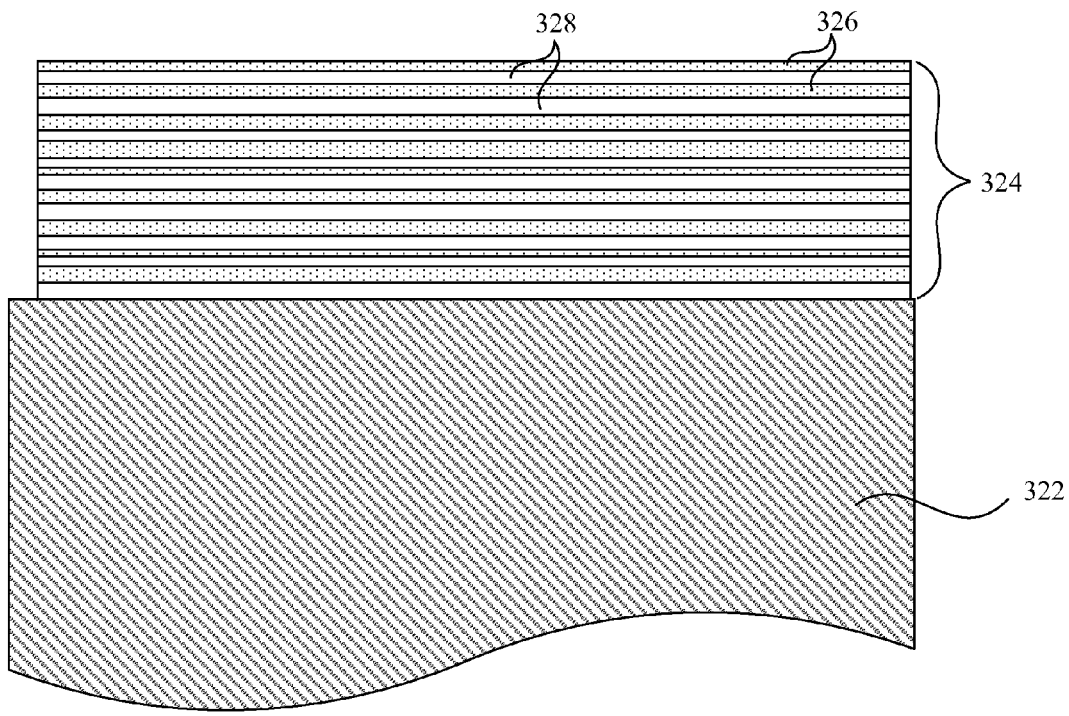
FIG. 5 illustrates a partial side cross-sectional view of an optical coating for an electronic device according to an example embodiment of the present disclosure.

In this regard, FIG. 5 illustrates a partial side cross-sectional view of a specialized optical coating 324 for an electronic device according to one example embodiment of the present disclosure. As shown, the optical coating 324 can be situated atop or otherwise proximate to a display cover 322 for a visual display (not shown). Such a visual display can be for an electronic device, among other possible devices.

The optical coating 324 can be comprised of numerous thin layers, ranging in thickness from about 10 to about 400 nanometers, although other thicknesses are possible. Each layer can be comprised of a material having a high or low index of refraction, and the layers are preferably interleaved or alternated between high and low indices of refraction. Preferably, desirable wavelengths of light are transmitted through optical coating 324, while unwanted wavelengths are reflected away from the optical coating, similar to that which occurs for a "hot mirror." In addition, the various layers and thicknesses of optical coating 324 may be designed such that most blackbody radiation is neither transmitted nor reflected, but rather absorbed by and transmitted throughout the optical coating itself.

Although more than two different materials can certainly be used, as may be desired, only two different materials for the various layers are shown here for purposes of illustration. As shown, a first set of layers 326 is composed of a first material having one index of refraction, while a second set of layers 328 is composed of a second different material having a different index of refraction. In one particular non-limiting example, the two different materials can be silicon dioxide and tantalum pentoxide, having indices of refraction of about 1.45 and 2.10 respectively. Again, layers of other materials can be added to or substituted for these particular materials, so long as there is a significant difference between layers in the indices of refraction.

Figure 6:
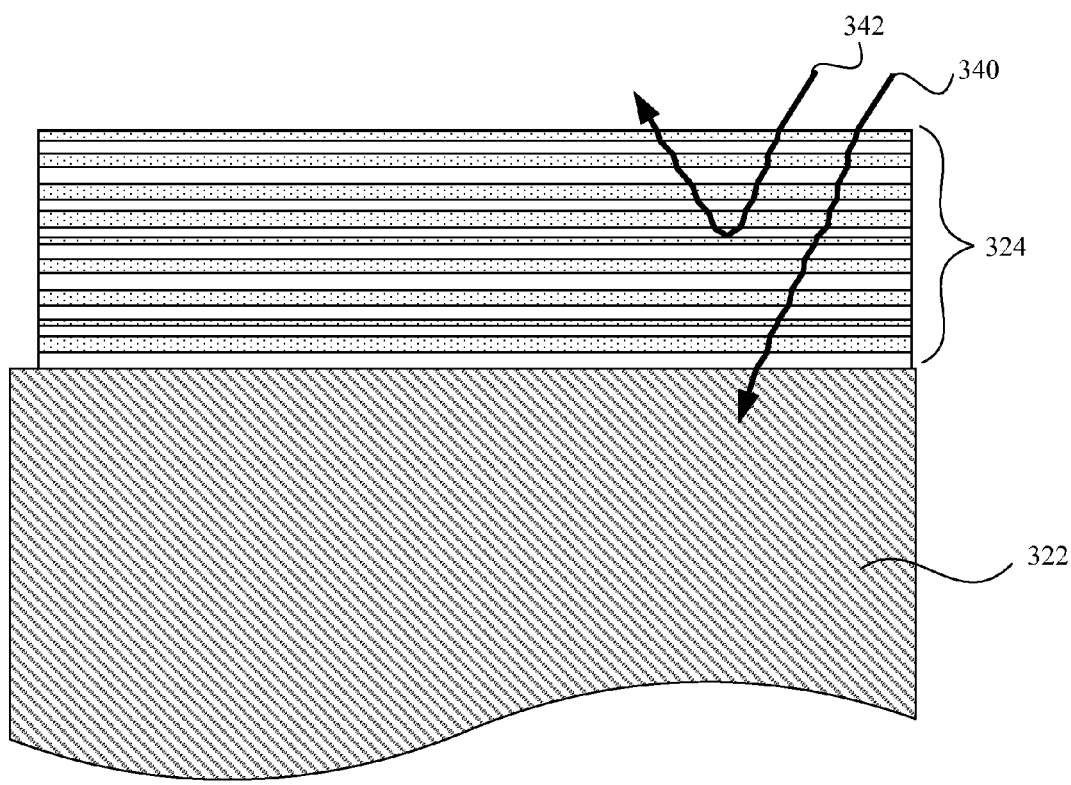
FIG. 6 illustrates a partial side cross-sectional view of the optical coating of FIG. 5 transmitting a visible light wavelength and reflecting an infrared light wavelength according to an example embodiment of the present disclosure.

FIG. 6 illustrates the optical coating 324 of FIG. 5 transmitting a visible light wavelength and reflecting an infrared light wavelength. As shown, visible light wavelength 340 incumbent upon the optical coating 324 and the display cover 322 is permitted to transmit through both of these items. Although the alternating indices of refraction of the various optical coating layers may alter the path of wavelength 340 a bit, the wavelength is ultimately transmitted all the way therethrough, as are other visible light wavelengths. As will be appreciated, similar light wavelengths from the display located beneath the display cover 322 will transmit upward and through the display cover and the optical coating 324, and will then be visible to users of the electronic device having the display. Conversely, light having an infrared wavelength 342 is ultimately reflected back away from the display cover 322 due to the arrangement of layers in the optical coating 324, which substantially prevents the infrared wavelength from entering and heating the device through the display cover. Similar results preferably occur for other infrared wavelengths.

Figure 7:
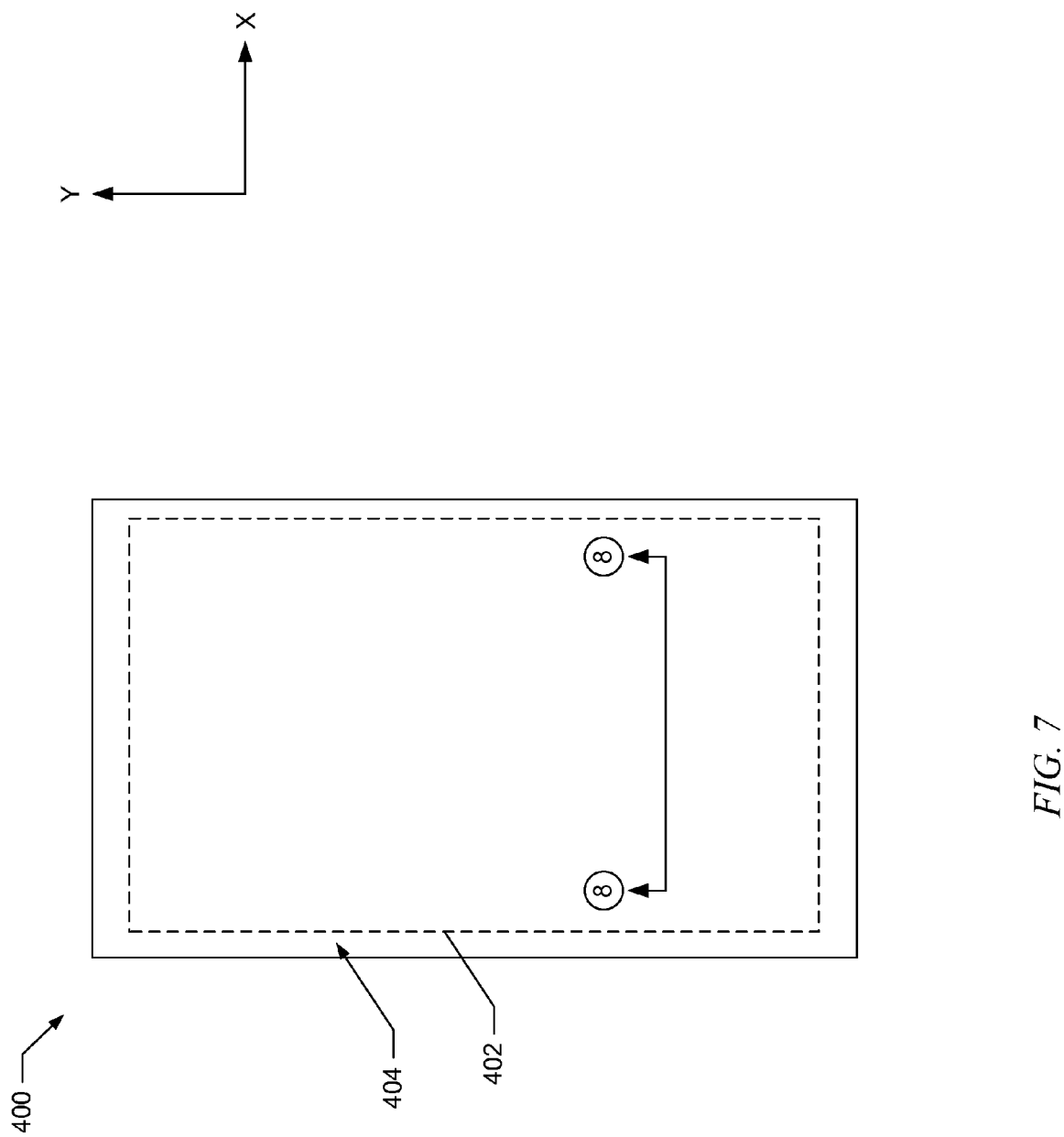
FIG. 7 illustrates a top view of an embodiment of a portable electronic device including a display and a protective assembly according to an example embodiment of the present disclosure.

As noted above, embodiments of the present disclosure relate to chemical strengthening. In this regard, FIG. 7 illustrates a top view of a portable electronic device 400 according to an additional embodiment of the present disclosure that is subjected to chemical strengthening as described hereinafter. For example, the portable electronic device 400 may comprise a smartphone. As illustrated, the portable electronic device 400 may include a display assembly including a display 402 configured to output one or more graphical images and a protective assembly 404 positioned thereon and configured to cover and protect the display.

Figure 8:
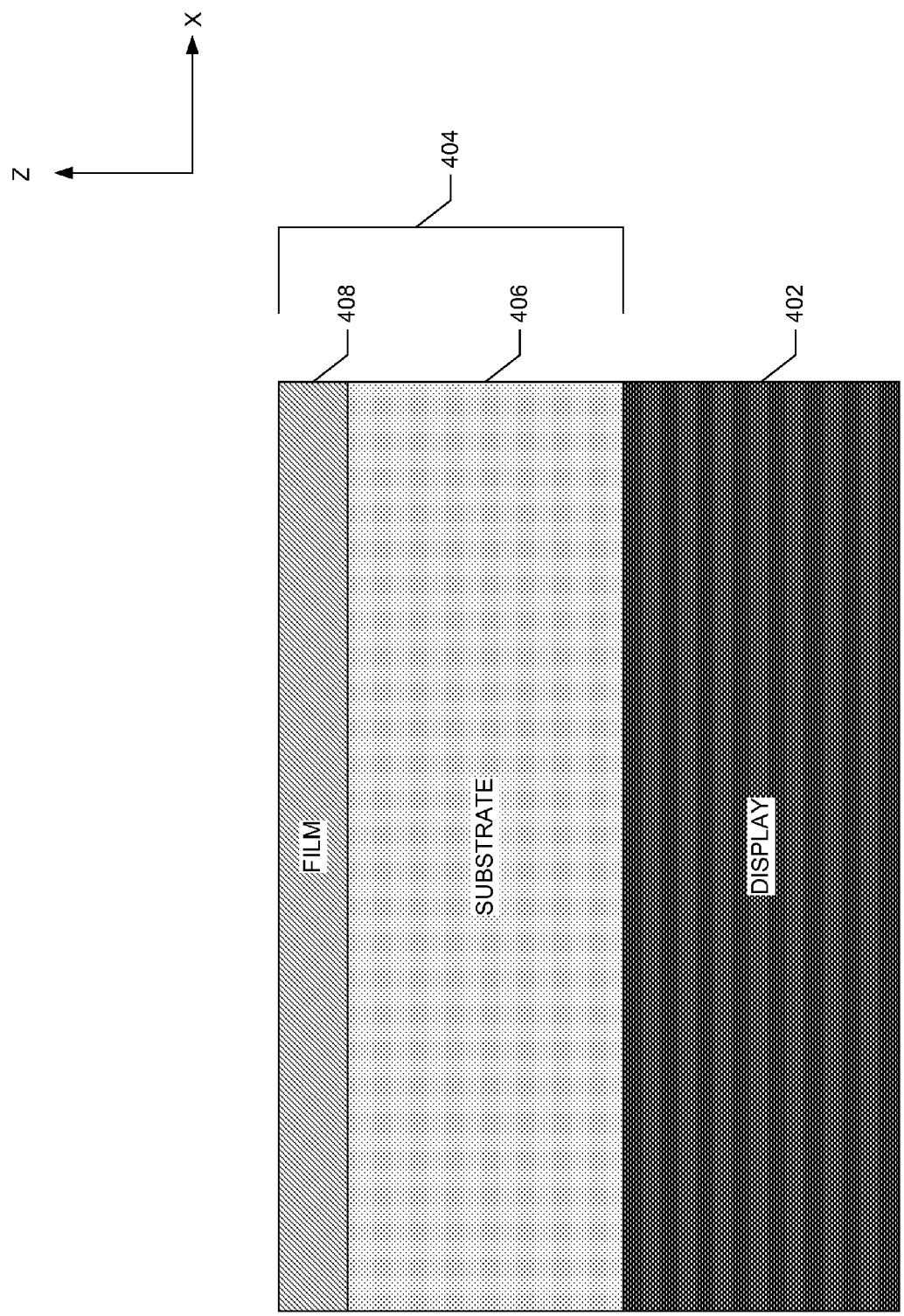
FIG. 8 illustrates a sectional view through the display and a film and substrate of the protective assembly of FIG. 7 along line 8-8 according to an example embodiment of the present disclosure.

FIG. 8 schematically illustrates a sectional view through a display assembly including the display 402 and the protective assembly 404 of the portable electronic device 400 along line 8-8 from FIG. 7. As illustrated, the protective assembly 404 may include a substrate 406 and a film 408. In some embodiments the film 408 may be directly coupled to the substrate 406 (e.g., deposited thereon). In another embodiment an adhesive layer may couple the film 408 to the substrate 406.

In one embodiment the substrate 406 may comprise a glass panel. Use of a glass substrate may be preferable in some embodiments due to glass defining desirable optical properties. The glass may comprise silicon dioxide and one or materials such as aluminum, magnesium, sodium, etc. Note, however, that although the present disclosure generally describes usage of such films in conjunction with a glass substrate, the substrate may comprise various other substances in other embodiments (e.g., crystal, acrylic, plastic, sapphire, etc.). Accordingly, it should be understood that reference to a glass substrate is for example purposes only, and the substrate may comprise various other materials in accordance with embodiments of the present disclosure.

The film 408 may be configured to perform one or more functions. For example, the film 408 may be configured to protect the substrate 406 from damage such as cracks and scratches. In this regard, some materials employed as the substrate 406, such as glass, may be relatively brittle and otherwise prone to such damage when a hard and/or sharp object comes into contact therewith. Sharp objects, as used herein, refers to objects defining a surface area of about 2 square millimeters or less. In some embodiments each of the one or more layers of the film 408 may be at least partially transparent. Accordingly, the film 408 may be employed in conjunction with the display 402, without substantially detrimentally affecting the usability thereof.

The film 408 may additionally or alternatively be configured to reduce glare and reflections and/or perform other functions as described above. In this regard, the film 408 may comprise an anti-reflective film in some embodiments. In some embodiments the film 408 may comprise silicon dioxide and one or more other materials.

Figure 9:
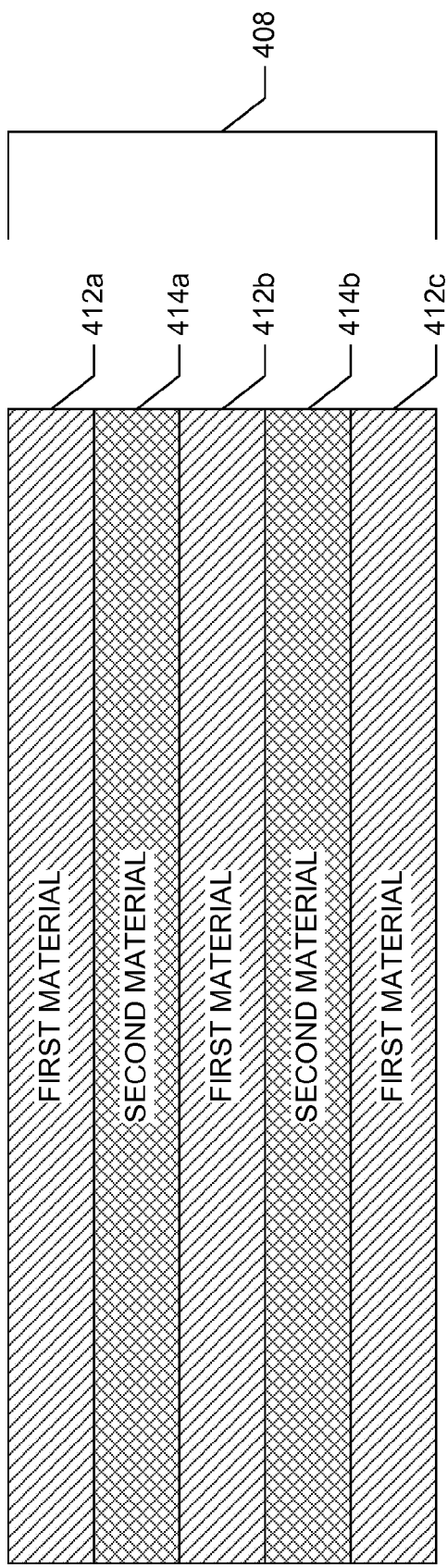
FIG. 9 illustrates a sectional view through the film of FIG. 8 according to an example embodiment of the present disclosure.

For example, FIG. 9 illustrates a sectional view through an embodiment of the film 408 including multiple layers. As illustrated, the film 408 may include layers of a first material 412a-c and layers of a second material 414a,b positioned therebetween. The layers of the first material 412a-c may define a relatively low index of refraction. In this regard, the layers of the first material 412a-c may comprise silicon dioxide in some embodiments. Conversely, the layers of the second material 414a,b may define a relatively higher index of refraction. In this regard, the layers of the second material 414a,b may comprise silicon nitride, titanium oxide, tantalum pentoxide, and/or tantalum oxide in some embodiments. This combination of layers defining relatively lower and higher indices of refraction may function to provide the film 408 with anti-reflective properties, as described above.

However, an issue with respect to the film 408 described above is that it may be relatively weak. In particular, silicon dioxide may be relatively weak. Accordingly, the film 408 may be prone to cracking or other damage. Such cracks may form as a result of a bending moment being applied to the portable electronic device 400, impacts, or other events.

Further, as a result of the film 408 being relatively weak, such cracks may spread throughout a substantial portion of the film. Additionally, in some instances cracks in the film 408 may propagate into the substrate 406. Due to propagation of the cracks through the protective assembly 404, it may be relatively hard to view the display 402 thereunder. Regardless of the cause of the damage, the propagated cracks in the protective assembly 404 may substantially impair the usability of the portable electronic device 400.

Figure 10:
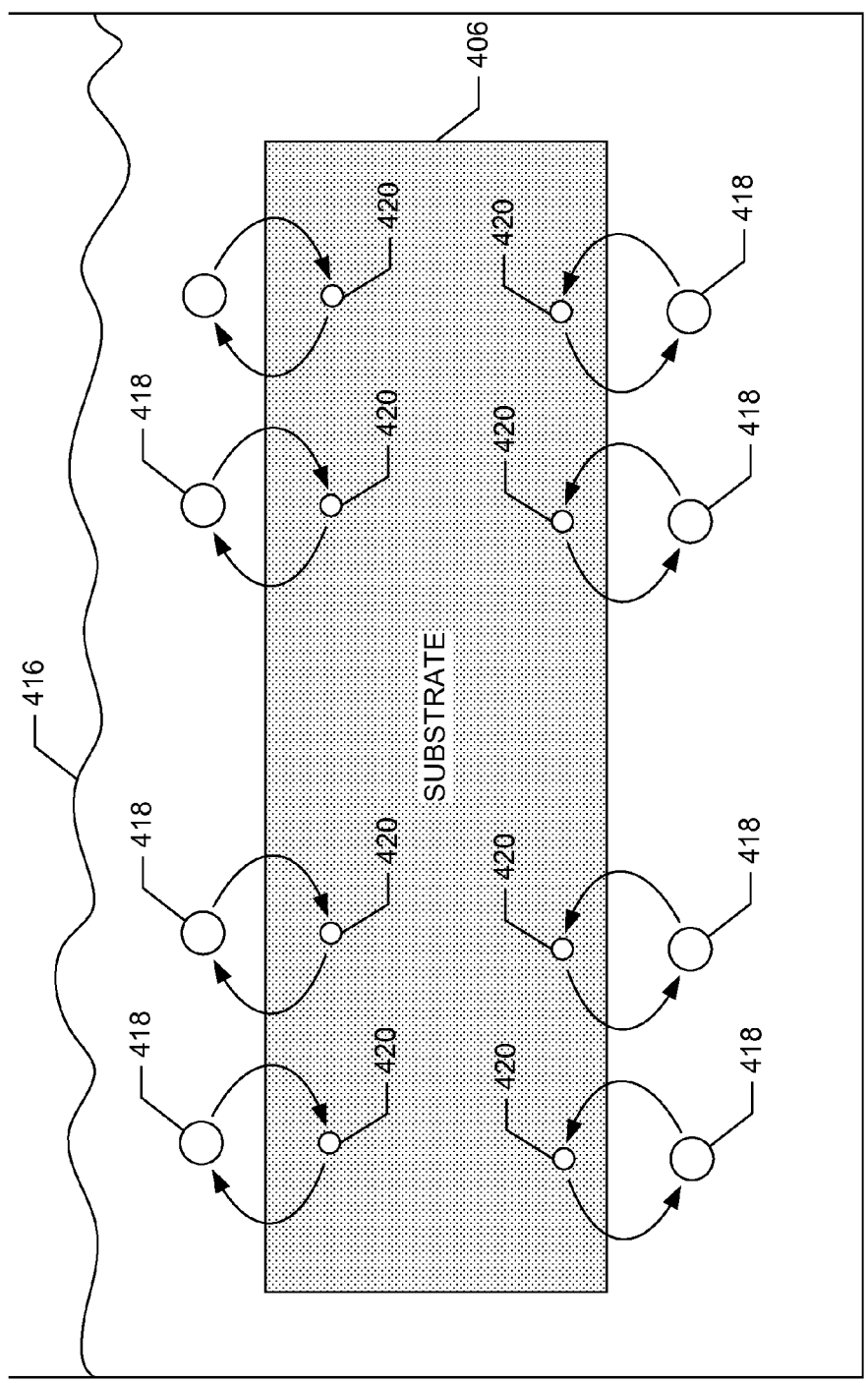
FIG. 10 schematically illustrates chemically strengthening the substrate of FIG. 8 according to an example embodiment of the present disclosure.

Accordingly, embodiments of the present disclosure are directed to strengthening the protective assembly 404. In this regard, FIG. 10 illustrates chemical strengthening of the substrate 406. A chemically strengthened substrate (e.g., glass) is a type of substrate that has increased strength as a result of a post-production chemical process performed thereon. Chemically strengthened glass may be six to eight times stronger than unstrengthened float glass. Accordingly, the benefits associated with use of chemically strengthened substrates may be substantial.

Substrates may be chemically strengthened using a species exchange process whereby a native species (sodium (Na), for example) is replaced by a species having a larger size (potassium (K), for example). The exchange can be facilitated by a surface finishing process. As illustrated, in one embodiment the substrate 406 may be submersed in a fluid 416 in order to chemically strengthen the substrate. For example, fluid 416 into which the substrate 406 is submersed may comprise a potassium salt (e.g., potassium nitrate) at an elevated temperature.

As illustrated, potassium ions or atoms 418 in the potassium nitrate fluid 416 may exchange with sodium ions or atoms 420 of the substrate 406. This exchange may cause the substrate 406 to harden. More particularly, the potassium atoms 418 are larger than the sodium atoms 420 and the potassium atoms wedge into the gaps left by the smaller sodium atoms when they migrate to the potassium nitrate solution. Accordingly, this substitution causes compressive stresses on the substrate 406, particularly around the outer surface thereof, where the exchange of atoms may be greatest. Thus, the substrate 406 may be in a state of compression around the outer surface thereof and the core of the substrate may be in a state of compensating tension.

Another substrate strengthening process may include at least two stages in which the substrate is first immersed in a sodium nitrate bath at an elevated temperature (e.g., 450° C.), which enriches the surface of the substrate with sodium ions. Accordingly, when the substrate is thereafter immersed in, or otherwise exposed to a fluid including larger ions or atoms that exchange therewith in the manner described above, a greater degree of ion or atom exchange may occur. In this regard, when the substrate is immersed in potassium nitrate, more sodium ions or atoms may be available to exchange with potassium ions or atoms. In this way, the use of a sodium nitrate bath increases the potential for surface compression in the finished substrate. Chemical strengthening results in a strengthening similar to toughened glass. However, the process does not use extreme variations of temperature and therefore chemically strengthened glass may have little or no bow or warp, optical distortion or strain pattern.

After the substrate 406 is strengthened, the film 408 may be coupled thereto. However, as noted above, it may be desirable to additionally or alternatively strengthen the film 408. Strengthening the film 408 may be employed to resist cracks from forming in the film that may otherwise propagate to the substrate 406, which may comprise a cover glass, glass panel, or cover panel, as described elsewhere herein.

Generally speaking, strengthening the film may be conducted by subjecting the layers of silicon dioxide thereof to an exchange process whereby smaller ions or atoms (e.g., sodium (Na) ions) are replaced by relatively larger ions or atoms (e.g., potassium (K) ions). More specifically, those layers of the film formed of silicon dioxide can be strengthened by replacing at least some of the sodium ions or atoms in a surface region with potassium ions or atoms. It should be noted that the exchange can occur chemically (using a potassium rich bath in which the film can be immersed in a manner described above) whereby potassium ions migrate a distance inwardly from the surface of the film. In some cases, however, it may be necessary to perform the exchange process from more than one direction (top and bottom, for example) if intervening layers of the film (SiN4, for example) prevent the diffusion of the potassium ions or atoms. In some cases, the exchange process can involve implanting potassium ions or atoms into the layers of the film requiring strengthening. In some cases, the potassium ions or atoms can be implanted through layers (such as SiN4) that heretofore block the thermal diffusion of potassium ions or atoms. In this way, silicon dioxide layers within the film can be strengthened by directly introducing potassium ions or atoms. In this way, a silicon dioxide layer in the film can be strengthened beyond the inherent strength of glass formed of primarily silicon dioxide.

Figure 11:
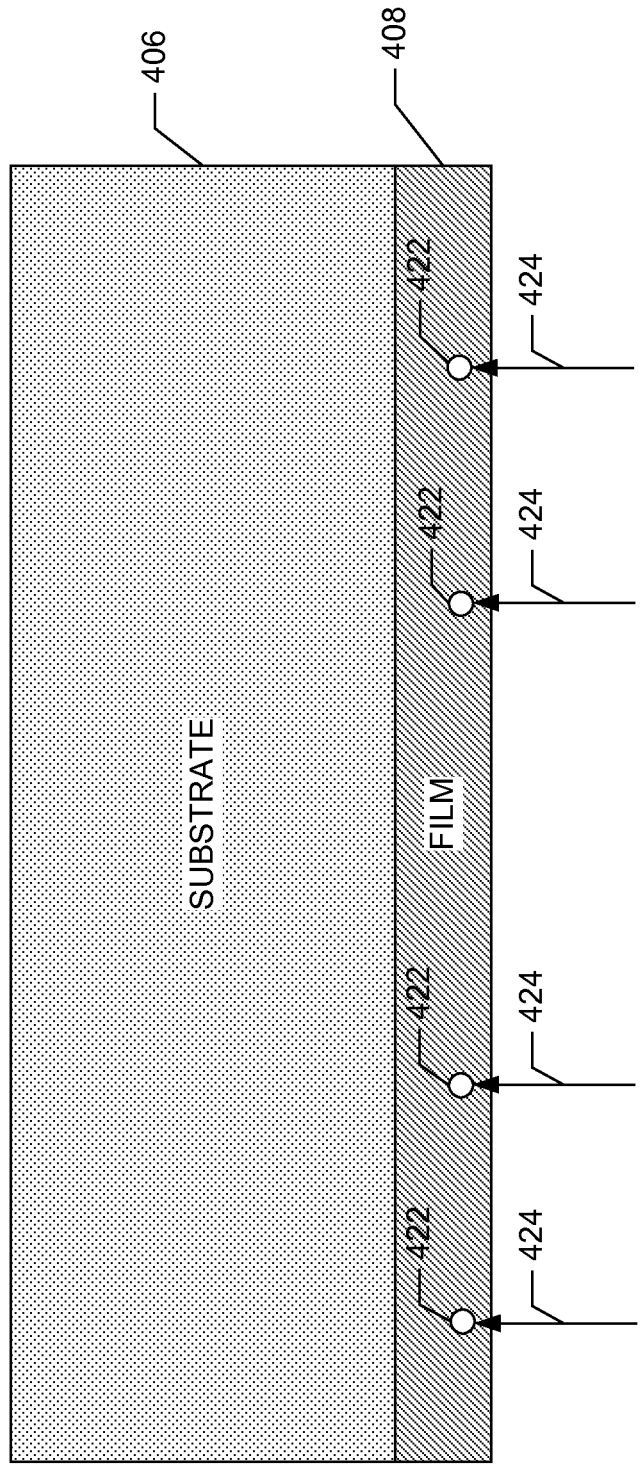
FIG. 11 schematically illustrates inserting sodium into the film of FIG. 8 according to an example embodiment of the present disclosure.
Figure 12:
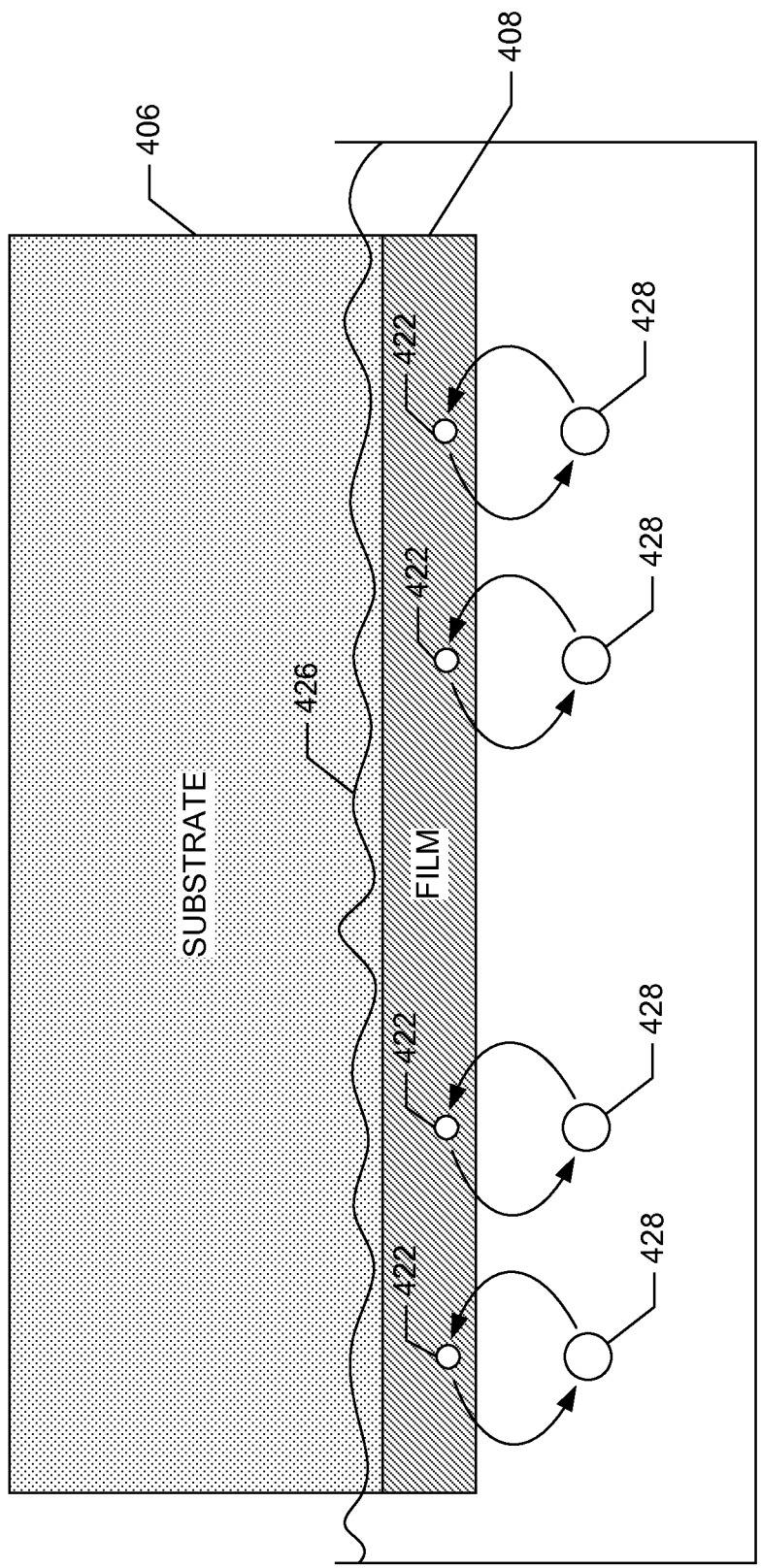
FIG. 12 schematically illustrates chemically strengthening the film of FIG. 8 after sodium insertion and after chemically strengthening the substrate of FIG. 8 according to an example embodiment of the present disclosure.

By way of greater particularity, FIGS. 11 and 12 illustrate an example embodiment of steps involved in strengthening a film. FIG. 11 illustrates insertion of sodium ions or atoms 422 into the material of the film 408, as indicated by arrows 424. In one embodiment sodium may inserted into the material that defines the film 408 prior to depositing the film on the substrate 406. In this regard, for example, the film 408 may be doped with sodium (e.g., using dopants) prior to coupling with the substrate 406. In another embodiment the film 408 may be coupled to the substrate 406, and then the sodium may be inserted in the film 408 by ion or atom implantation.

Thereafter, as illustrated in FIG. 12, the film 408 may be subjected to chemical strengthening. As illustrated, in one embodiment the film 408 may be submersed in a fluid 426 in order to chemically strengthen the film. For example, the fluid 426 may comprise potassium nitrate. As illustrated, potassium ions or atoms 428 in the potassium nitrate fluid 426 may exchange with sodium ions or atoms 422 of the film 408. This exchange may cause the film 408 to harden. More particularly, the potassium atoms 428 are larger than the sodium atoms 422, and hence this substitution causes compressive stresses on the film 408, particularly around the outer surface thereof, where the exchange of atoms may be greatest.

Figure 13:
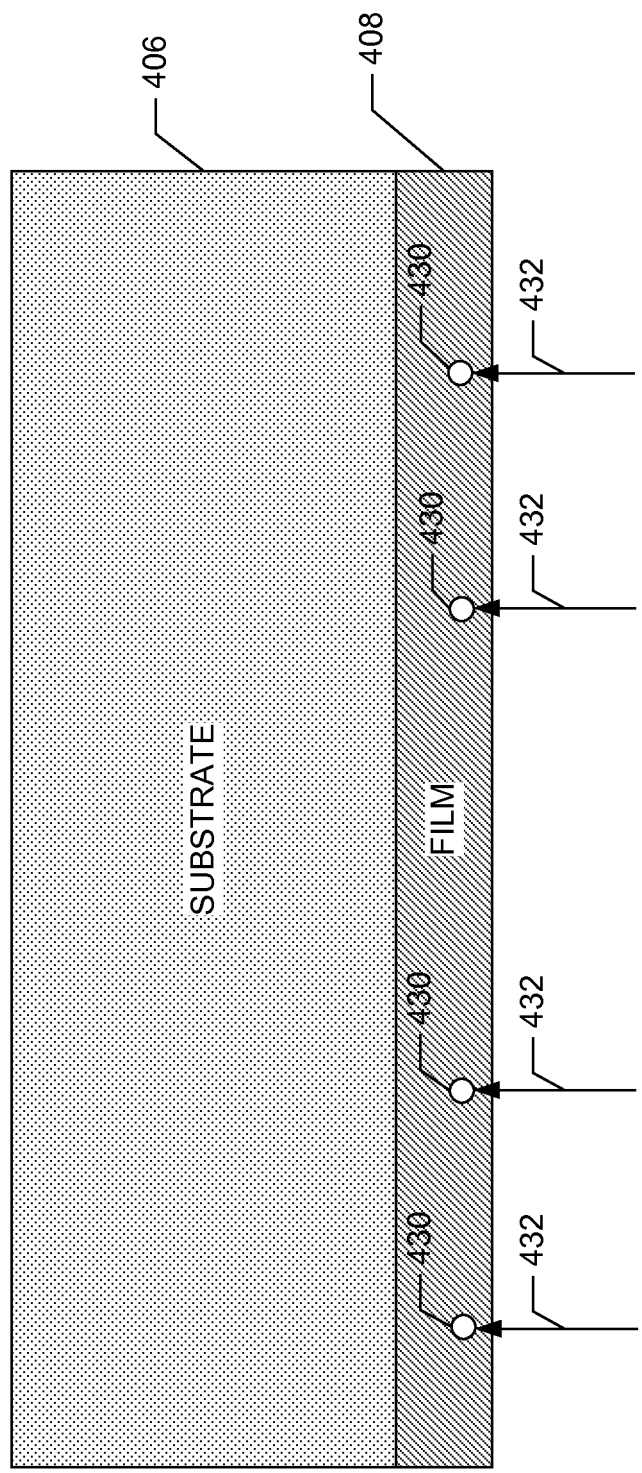
FIG. 13 schematically illustrates inserting sodium into the film of FIG. 8 according to an example embodiment of the present disclosure.

However, the film 408 and the substrate 406 may be strengthened in other manners. For example, as illustrated in FIG. 13, in one embodiment the film 408 may be coupled to the substrate prior to the substrate 406 being strengthened. In order to allow for strengthening of the film 408, sodium ions or atoms 430 may be inserted into the material of the film 408, as indicated by arrows 432. In one embodiment sodium may inserted into the material that defines the film 408 prior to depositing the film on the substrate 406. In this regard, for example, the film 408 may be doped with sodium (e.g., using dopants) prior to coupling with the substrate 406. In another embodiment the film 408 may be coupled to the substrate 406, and then the sodium may be inserted in the film 408 by ion exchange.

Figure 14:
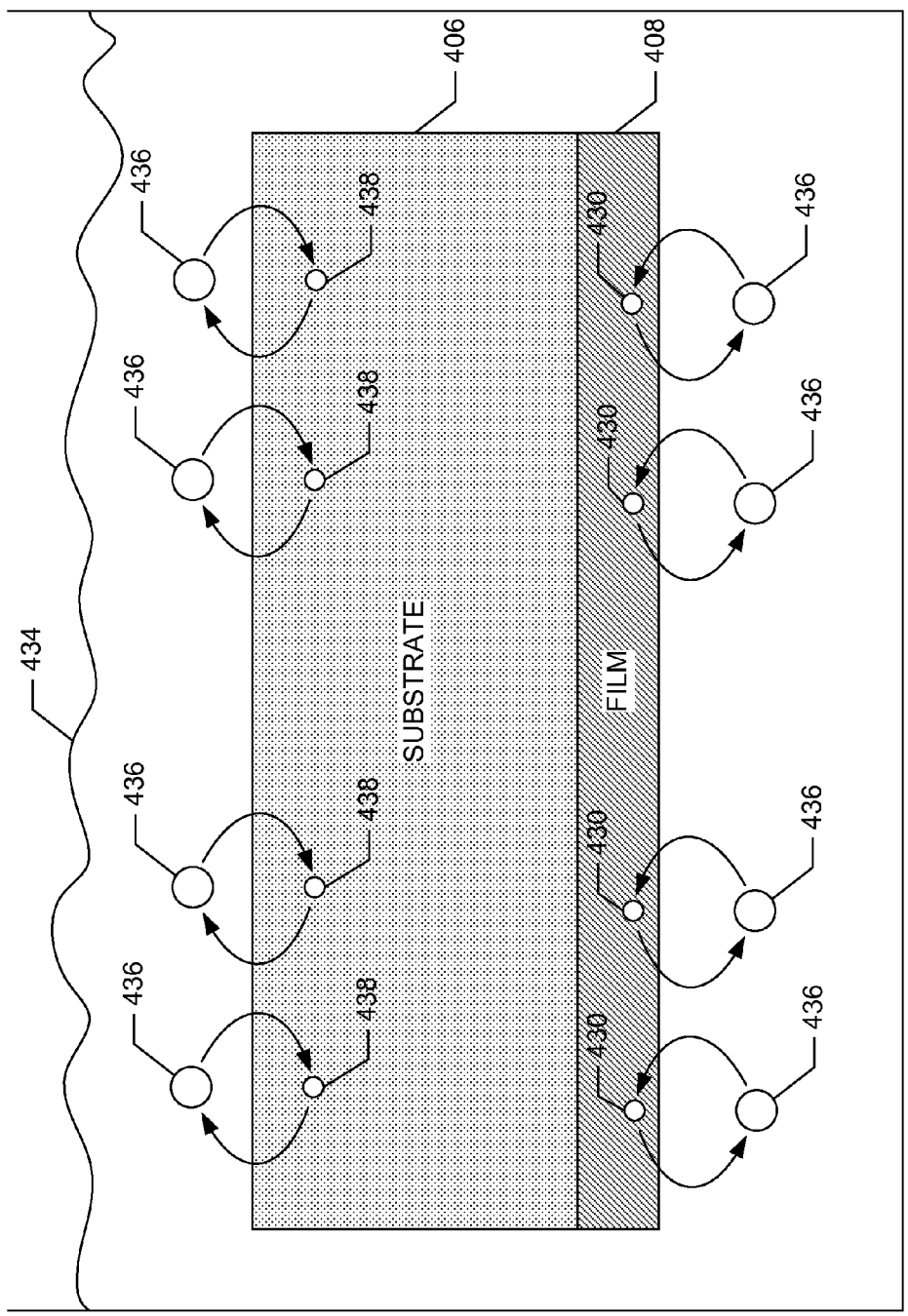
FIG. 14 schematically illustrates substantially simultaneously chemically strengthening the film and substrate of FIG. 8 after sodium insertion into the film according to an example embodiment of the present disclosure.

Thereafter, as illustrated in FIG. 14, the substrate 406 and the film 408 may be subjected to chemical strengthening. As illustrated, in one embodiment the substrate 406 and the film 408 may be submersed in a fluid 434 in order to chemically strengthen the film. For example, the fluid 434 may comprise potassium nitrate. As illustrated, potassium ions or atoms 436 in the potassium nitrate fluid 426 may exchange with the sodium ions or atoms 430 inserted in the film 408 and sodium ions or atoms 438, which may already be present in the substrate 406. This exchange may cause the substrate 406 and the film 408 to harden. More particularly, the potassium atoms 436 are larger than the sodium atoms 430, 438, and hence this substitution causes compressive stresses on the substrate 406 and the film 408, particularly around the outer surfaces thereof, where the exchange of atoms may be greatest.

Note that in the above-described methods, additional steps may be performed. For example, the film 408 may be annealed after the sodium is inserted therein. In this regard, insertion of the sodium into the film 408 may cause damage to the film. Annealing the film 408 may repair such damage and assist in bonding the sodium to the film 408.

Note that the sodium may be inserted in the film 408 via various other manners in other embodiments. For example, the substrate 406 may include a layer enriched with sodium proximate an outer surface to which the film 408 couples. Thereby, the sodium may diffuse out of the enriched layer of the substrate 406 into the film 408, such that exchange of the sodium with potassium may thereafter occur as described above.

Further, in another embodiment, insertion of sodium into the film 408 may not be employed. Rather, the potassium may be directly inserted into the film 408 (or the substrate 406). Accordingly, in some embodiments the intermediate step of inserting sodium into the film 408 may be avoided.

In some embodiments one or more of another species such as aluminum oxide, magnesium oxide, and boron nitride may be added to the film 408. In this regard, one or more of these materials may assist in diffusion of potassium through the film 408. Thus, for example, the film 408 may be formed from silicon dioxide plus an aluminum oxide dopant (and/or the other above-mentioned materials). In another embodiment the aluminum oxide (and/or the other above-mentioned materials) could be inserted into the film 408 with the sodium or with the potassium (e.g., co-deposited) or subsequent thereto. The other species can be implanted in varying combinations and proportions.

Exchange of sodium ions or atoms with potassium ions or atoms is generally discussed herein as being employed to strengthen components such as films and substrates. However, in other embodiments various other elements may be exchanged. In this regard, exchange of relatively smaller ions or atoms with relatively larger ions or atoms, defining a greater volume or size, may strengthen materials in the manner discussed herein, so long as the compressive state is not relieved upon completion of the exchange. In other words, retention of the compressive state proximate the surface of the component at which the exchange occurs may be required to retain a strengthened state.

Note further that the strengthening process described herein could be employed to strengthen any of various films, coatings, and substrates. Thus, for example, sodium could be inserted into a glass substrate, and the sodium could be exchanged with potassium to strengthen the glass substrate. Alternatively, potassium may be directly inserted as described above.

In one embodiment a film of silicon dioxide may be applied to a substrate (e.g., glass) to create a smooth outer surface substantially free of defects by filling any defects in the substrate. In this regard, substrates may initially define certain surface defects. The surface defects can be related to finishing operations such as polishing that invariably leave microcracks or other visible or potentially visible surface defects that have the potential to initiate cracks that can propagate into and possibly through the glass substrate thereby weakening the glass substrate. The layer of silicon dioxide can be deposited over the surface of the glass substrate in such a way to encapsulate the defects thereby eliminating the defects as a potential source of cracks. Optionally, the layer of silicon dioxide can then be strengthened using any of the techniques described herein.

Further, the insertion of sodium or direct insertion of potassium may be conducted selectively, such that locations on the film or substrate are selectively strengthened. Masking may be employed to cause the selective strengthening. For example, selective insertion may occur at locations that may be subjected to stress over and above that expected by a majority of the film or substrate. By way of further example, in one embodiment the corners of a film on a substrate may be strengthened. Thus, corner regions of a cover glass can be implanted with potassium or other appropriate species in order to provide extra strength in those portions subjected to excess stress (e.g., caused by a fall event). In this regard, in the event that the strengthening affects the optical properties of the protective assembly, such strengthening may only be provided, or may be provided to a greater extent, outside of the active viewing area through the protective assembly such that a view of the display is not blocked.

In accordance with an embodiment of the present disclosure, an electronic device display is additionally provided. The device display may include a visual display unit adapted to provide a visual display to a user of an electronic device associated with the electronic device display, a transparent display cover situated proximate to the visual display unit, and an optical coating disposed proximate said display cover, said optical coating including a plurality of layers of different materials and thicknesses at least one of which is a strengthened layer of glass formed of silicon dioxide wherein said optical coating is adapted to transmit therethrough most of all visible wavelengths of light collectively, reflect therefrom most of all non-visible wavelengths of light collectively, and to absorb most blackbody radiation generated from within the electronic device. The optical coating may be selectively strengthened at specific regions subjected to excess stress. The layers may consist of alternating layers of two different materials, which may be silicon dioxide and tantalum pentoxide. The arrangement and thicknesses of the layers may be designed based upon the thickness and optical properties of the transparent display cover.

Figure 15:
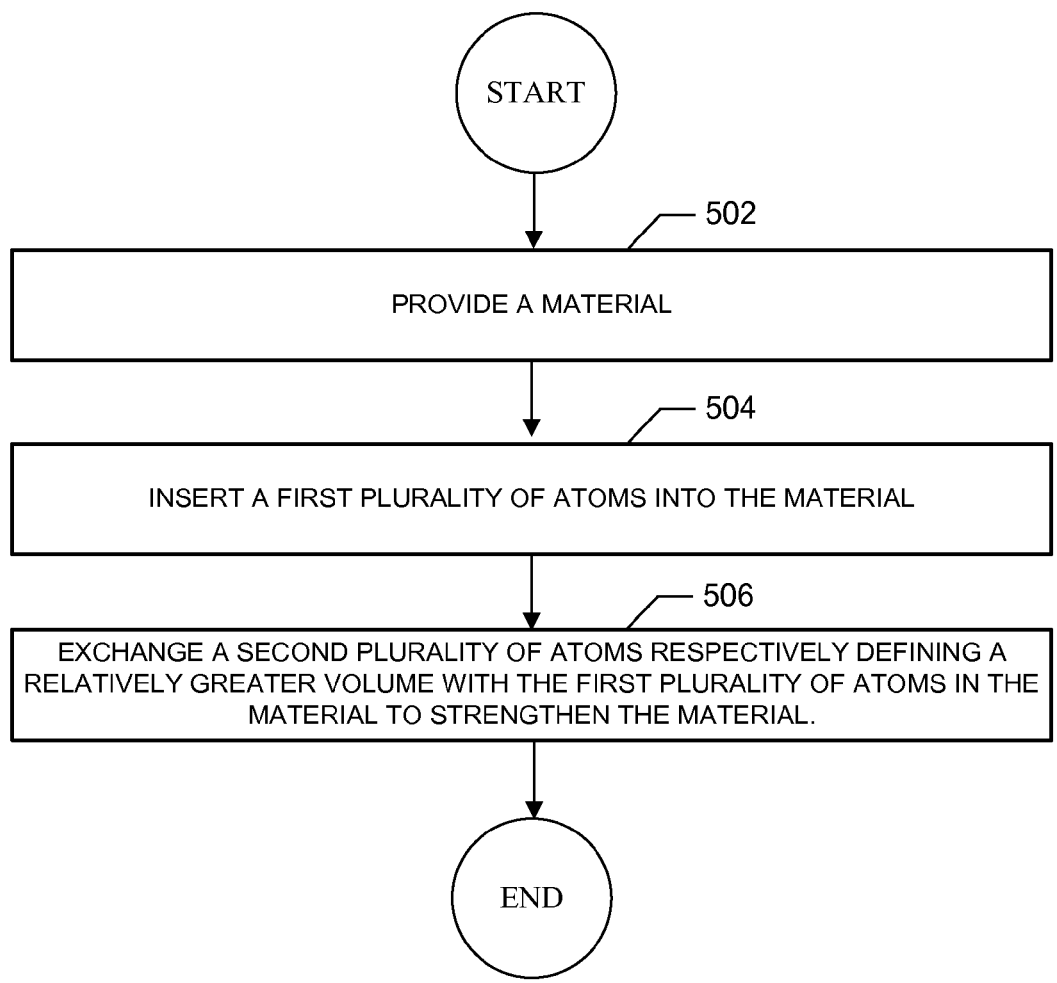
FIG. 15 schematically illustrates a method for strengthening a material according to an example embodiment of the present disclosure.

A related method for strengthening is also provided. As illustrated in FIG. 15, the method may include providing a material at operation 502. Further, the method may include inserting a first plurality of atoms into the material at operation 504. Additionally, the method may include exchanging a second plurality of atoms respectively defining a relatively greater volume with the first plurality of atoms in the material to strengthen the material at operation 506.

In some embodiments the first plurality of atoms may comprise sodium and the second plurality of atoms may comprise potassium. The material may define an anti-reflective film. The method may further comprise coupling the anti-reflective film to a substrate. Further, the method may include strengthening the substrate. Strengthening the substrate may be conducted substantially simultaneously with, or after, exchanging the second plurality of atoms respectively defining the relatively greater volume with the first plurality of atoms in the material to strengthen the material of the anti-reflective film at operation 506. Additionally, the method may include annealing the material prior to exchanging the second plurality of atoms respectively defining a relatively greater volume with the first plurality of atoms in the material to strengthen the material at operation 506.

Figure 16:
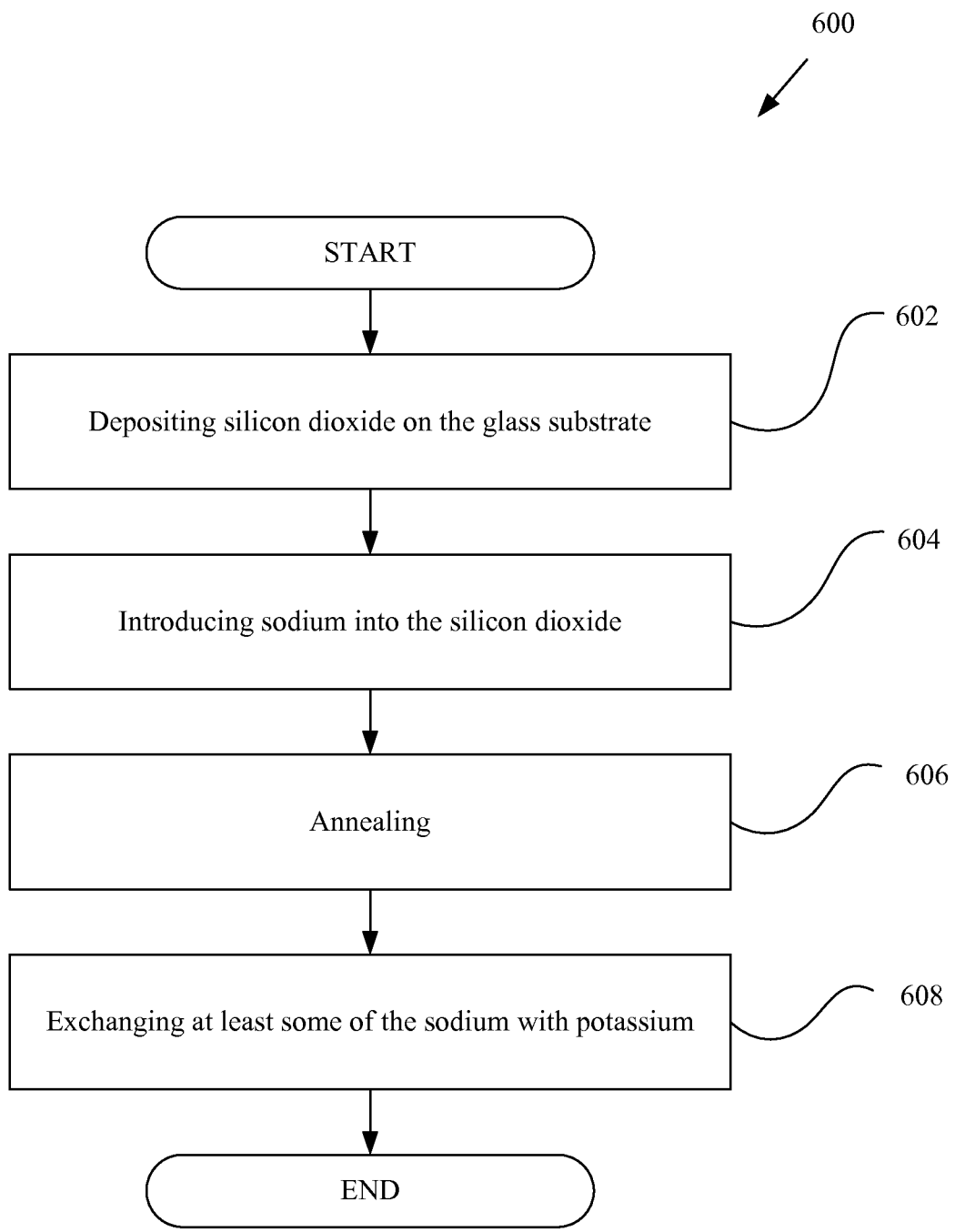
FIG. 16 schematically illustrates a flowchart detailing a strengthening process according to an example embodiment of the present disclosure.

FIG. 16 shows a flowchart detailing process 600 for strengthening an anti-reflective coating on a substrate in accordance with the described embodiments. At 602, the anti-reflective coating is deposited on the glass substrate. At 604, Na ions are implanted into the anti-reflective coating. At 606, the anti-reflective coating is annealed. The annealing promotes repair of any defects caused by the implantation. At 608, a potassium (K) exchange process takes place. The K exchange process can be chemical in nature in which the anti-reflective coating is immersed in a K rich bath and the K ions migrate by thermal diffusion from the bath to a surface region of the anti-reflective coating replacing at least some of the sodium in the ARC. In another embodiment, the K ions can be implanted directly using an ion implanter. In this case, a mask can be used to selectively implant K ions in the anti-reflective layer to provide regions of greater strength than other regions. For example, regions of the anti-reflective coating near corners (or other regions susceptible to excess stress during, for example, a drop event) can be exposed to greater concentrations of K ions than other regions particularly those regions that overlay optically important areas such as a display.

In another embodiment, a method for improving a display of an electronic device is provided. The method may include determining the thickness and optical properties of a display cover adapted to be situated proximate to a visual display unit of an electronic device, designing an optical coating adapted to be placed proximate the display cover, said optical coating including a plurality of layers of different materials and thicknesses, wherein said optical coating is adapted to transmit therethrough most of all visible wavelengths of light collectively and reflect therefrom most of all non-visible wavelengths of light collectively, and strengthening at least one of the plurality of layers comprising silicon dioxide.

It will be readily appreciated that the refined and specialized optical coating and devices to which it is applied provide clear improvements and benefits over previous devices for which device overheating can be an issue. One notable application is simply the substantially permanent application of an optical coating to a display cover or cover glass during the manufacturing of a device. Such a permanent application can be atop, inside or at the bottom of the display cover, as may be desired by a given manufacturer. In addition to a simple permanent application of an optical coating to an existing device though, there are further applications that may prove useful to consumers.

Figure 17:
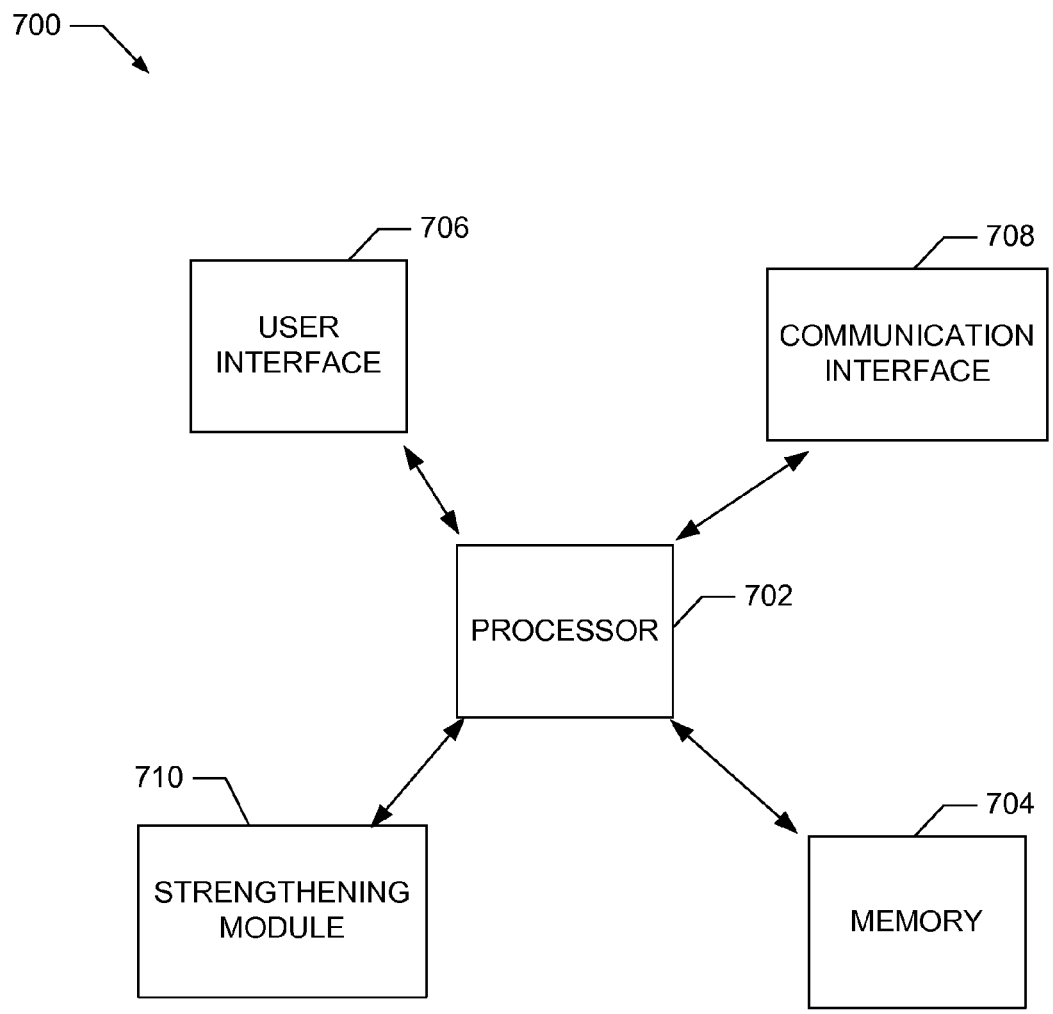
FIG. 17 schematically illustrates a block diagram of an electronic device according to an example embodiment of the present disclosure.

FIG. 17 is a block diagram of an electronic device 700 suitable for use with the described embodiments. In one example embodiment the electronic device 700 may be embodied in or as a controller configured for controlling operations performed in strengthening materials as described herein. In this regard, for example, films on substrates and/or the substrates themselves may be strengthened as described herein.

The electronic device 700 illustrates circuitry of a representative computing device. The electronic device 700 may include a processor 702 that may be microprocessor or controller for controlling the overall operation of the electronic device 700. In one embodiment the processor 702 may be particularly configured to perform the functions described herein relating to strengthening materials. The electronic device 700 may also include a memory device 704. The memory device 704 may include non-transitory and tangible memory that may be, for example, volatile and/or non-volatile memory. The memory device 704 may be configured to store information, data, files, applications, instructions or the like. For example, the memory device 704 could be configured to buffer input data for processing by the processor 702.

Additionally or alternatively, the memory device 704 may be configured to store instructions for execution by the processor 702.

The electronic device 700 may also include a user interface 706 that allows a user of the electronic device 700 to interact with the electronic device. For example, the user interface 706 can take a variety of forms, such as a button, keypad, dial, touch screen, audio input interface, visual/image capture input interface, input in the form of sensor data, etc. Still further, the user interface 706 may be configured to output information to the user through a display, speaker, or other output device. A communication interface 708 may provide for transmitting and receiving data through, for example, a wired or wireless network such as a local area network (LAN), a metropolitan area network (MAN), and/or a wide area network (WAN), for example, the Internet.

The electronic device 700 may also include a strengthening module 710. The processor 702 may be embodied as, include or otherwise control the strengthening module 710. The strengthening module 710 may be configured for controlling or executing the material strengthening operations as discussed herein including, for example, inserting sodium and exchanging the sodium with potassium or directly inserting the sodium.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

In this regard, a computer program product comprising at least one computer-readable storage medium having computer-executable program code portions stored therein is provided. The computer-executable program code portions may comprise program code instructions for providing a material, program code instructions for inserting a first plurality of atoms into the material, and program code instructions for exchanging a second plurality of atoms respectively defining a relatively greater volume with the first plurality of atoms in the material to strengthen the material.

In some embodiments the first plurality of atoms may comprise sodium and the second plurality of atoms may comprise potassium. The material may comprise an anti-reflective film. The computer program product may comprise program code instructions for coupling the anti-reflective film to a substrate. Further, the computer program product may include program code instructions for strengthening the substrate. In one embodiment the program code instructions for strengthening the substrate may comprise program code instructions for strengthening the substrate substantially simultaneously with exchanging the second plurality of atoms respectively defining a relatively greater volume with the first plurality of atoms in the material to strengthen the material of the anti-reflective film. In another embodiment the program code instructions for strengthening the substrate may comprise program code instructions for strengthening the substrate after exchanging the second plurality of atoms respectively defining a relatively greater volume with the first plurality of atoms in the material to strengthen the material of the anti-reflective film. The computer program product may further comprise program code instructions for annealing the material prior to exchanging the second plurality of atoms respectively defining a relatively greater volume with the first plurality of atoms in the material to strengthen the material.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A method for strengthening an anti-reflective coating, the method comprising:
   ion implanting a first chemical dopant into the anti-reflective coating without intermediate ion exchange, the first chemical dopant strengthening the anti-reflective coating; and
   exchanging at least some of the first chemical dopant within the anti-reflective coating with a second chemical dopant different than the first chemical dopant, the second chemical dopant further strengthening the anti-reflective coating,
   wherein the anti-reflective coating is substantially transparent to visible light and configured to reduce optical reflection of light incident a surface of the anti-reflective coating, the anti-reflective coating including a plurality of layers, wherein the first and second chemical dopants enter into at least one of the plurality of layers.

2. The method of claim 1, further comprising:
   annealing the anti-reflective coating after ion implanting the first chemical dopant and prior to exchanging at least some of the first chemical dopant with the second chemical dopant.

3. The method of claim 1, further comprising:
   coupling the anti-reflective coating with a substrate.

4. The method of claim 3, wherein the anti-reflective coating is coupled with the substrate after exchanging at least some of the first chemical dopant within the anti-reflective coating with the second chemical dopant.

5. The method of claim 3, wherein the anti-reflective coating is coupled with the substrate before ion implanting the first chemical dopant.

6. The method of claim 1, wherein the first chemical dopant comprises sodium and the second chemical dopant comprises potassium.

7. The method of claim 1, wherein exchanging at least some of the first chemical dopant with the second chemical dopant is performed by thermal diffusion.

8. A method of strengthening an anti-reflective coating, the method comprising:
   enriching a surface portion of a substrate with a first chemical dopant;
   depositing the anti-reflective coating on the surface portion of the substrate such that the first chemical dopant diffuses into the anti-reflective coating strengthening the anti-reflective coating; and
   exposing an exposed surface of the anti-reflective coating to a second chemical dopant such that the second chemical dopant enters the anti-reflective coating, wherein the anti-reflective coating is substantially transparent to visible light and is configured to reduce optical reflection of light incident a surface of the anti-reflective coating, wherein the first chemical dopant is different than the second chemical dopant, and wherein at least some of first chemical dopant within the anti-reflective coating is replaced with the second chemical dopant.

9. The method of claim 8, wherein enriching the surface portion of the substrate with the first chemical dopant comprises:
exposing the substrate to a fluid containing the first chemical dopant; and
elevating a temperature of the fluid increasing an amount of first chemical dopant entering into the substrate.

10. The method of claim 8, wherein the first chemical dopant includes sodium.

11. The method of claim 8, wherein the substrate is comprised of glass.

12. The method of claim 8, wherein the second chemical dopant within the anti-reflective coating further strengthens the anti-reflective coating.

13. The method of claim 8, wherein the second chemical dopant includes larger chemical species than the first chemical dopant such that second chemical dopant defines a greater volume within the anti-reflective coating than the first chemical dopant.

14. The method of claim 8, wherein the first chemical dopant includes sodium and the second chemical dopant includes potassium.

15. The method of claim 8, wherein the anti-reflective coating includes a plurality of layers, wherein the first chemical dopant enters into at least one of the plurality of layers.

16. A method of strengthening an anti-reflective coating, the method comprising:
ion implanting a first chemical dopant into the anti-reflective coating strengthening the anti-reflective coating without intermediate ion exchange, the anti-reflective coating being substantially transparent to visible light and configured to reduce optical reflection of light incident a surface of the anti-reflective coating; and
ion implanting a second chemical dopant into the anti-reflective coating without intermediate ion exchange, the second chemical dopant different than the first chemical dopant, wherein the second chemical dopant defines a greater volume within the anti-reflective coating than the first chemical dopant further strengthening the anti-reflective coating, wherein the second dopant is selectively implanted proximate to corner regions of an underlying glass substrate.

17. The method of claim 16, wherein a mask is used to selectively implant the second chemical dopant.

* * * * *